R. N. BURGEDORFF.
MEANS FOR PROPELLING BICYCLES OR SIMILAR MACHINES.
APPLICATION FILED JUNE 9, 1917.

1,269,681.

Patented June 18, 1918.

Inventor
R. N. Burgedorff.
By
Attorney

UNITED STATES PATENT OFFICE.

RAYMOND N. BURGEDORFF, OF DENVER, COLORADO.

MEANS FOR PROPELLING BICYCLES OR SIMILAR MACHINES.

1,269,681.   Specification of Letters Patent.   Patented June 18, 1918.

Application filed June 9, 1917. Serial No. 173,742.

*To all whom it may concern:*

Be it known that I, RAYMOND N. BURGEDORFF, a citizen of the United States, residing in the city and county of Denver and State of Colorado, have invented certain new and useful Improvements in Means for Propelling Bicycles or Similar Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to an improvement for propelling a bicycle or similar machine, and it is my object to present a construction of this character which can be attached to any bicycle of ordinary construction regardless of its make or size and one that will render the propulsion of the machine less difficult, inasmuch as the amount of energy required will be greatly reduced due to the increased leverage which I obtain; and a particular feature of my invention is that I obtain this increased leverage without lengthening the ordinary cranks of the machine. Also, in view of these facts more power is created with less effort than has heretofore been possible when using a machine of the usual construction.

My improvement, briefly stated, comprises two members adapted to respectively oscillate up and down, and ride forward and backward upon anti-frictional bearings attached to both extremities of the hub of the rear wheel, the said members being located outside of the frame of the machine and having a forwardly projecting part secured to the respective pedals of said machine. This forwardly projecting part terminates considerably forward of the pedal in a slightly up-turned portion, which is flattened out and roughened to form a foot tread, and when the machine is in use the feet of the operator will engage these flattened portions instead of the regular pedal.

Having briefly outlined my improvement I will proceed to describe the same in detail, reference being made to the accompanying drawing, in which is illustrated an embodiment thereof. In this drawing.

Figure 1:
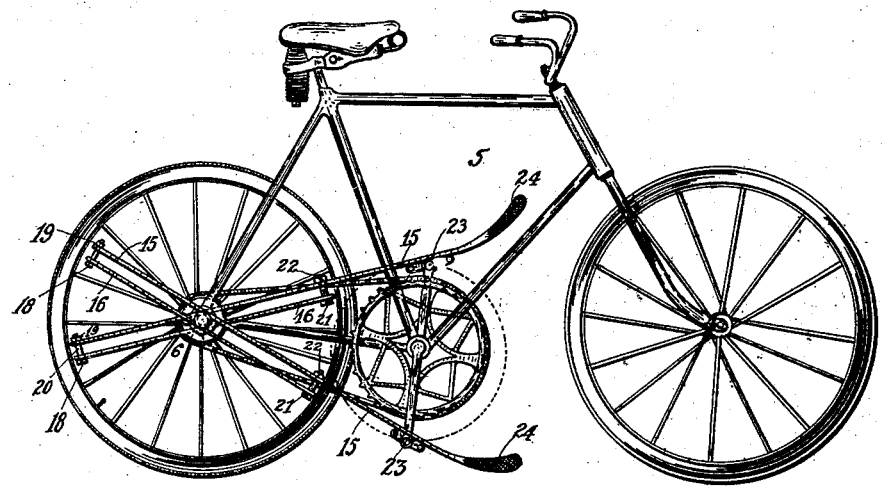
Figure 1 is a view in elevation showing a bicycle of ordinary construction equipped with my improvement.
Figure 2:
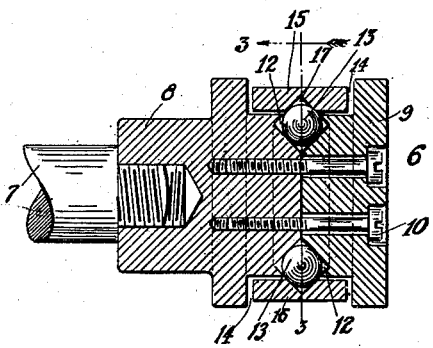
Fig. 2 is a sectional view taken on the line 2—2, Fig. 3, looking in the direction of the arrow.
Figure 3:
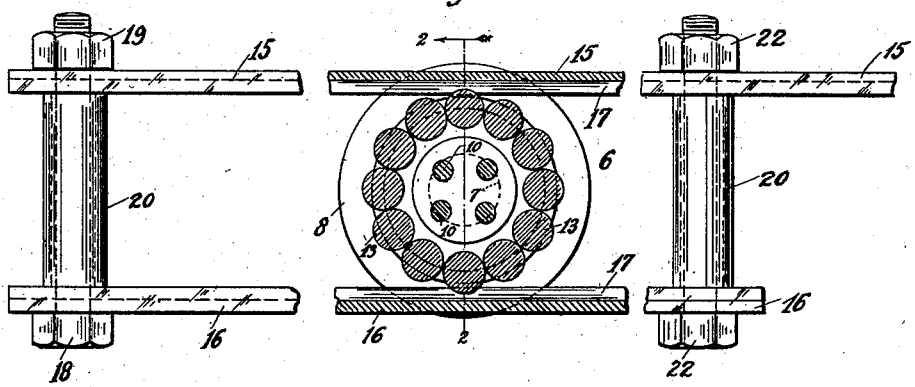
Fig. 3 is a section taken on the line 3—3 Fig. 2 looking in the direction of the arrow.

Let the numeral 5 designate a bicycle of ordinary construction and 6 a circular shaped bearing member screwed upon the opposite extremities of the hub 7 of the rear wheel and located outside the frame of the bicycle. This bearing member is composed of two parts 8 and 9, secured together by means of four bolts 10, the heads of which are counter-sunk in the outer face of the part 9. The adjacent faces of the two parts 8 and 9 have similarly shaped recesses formed therein, as disclosed at 12, which provide a race-way for balls 13 which are adapted to protrude slightly out of the race-way into a circumferential groove 14 formed in the periphery of the bearing member 6.

Mounted to oscillate and ride upon these balls within the groove 14 are two bars 15 and 16, the bar 15 being considerably longer than the bar 16 and projecting forwardly beyond the latter. These bars are arranged in parallel relation and are adapted to respectively engage at all times two of the balls 13, which are diametrically opposite each other and the under surface of each of the said bars is provided with a V-shaped groove 17, which will prevent lateral movement of the bars when riding upon the said balls. The rear extremities of the bars 15 and 16 are connected together by means of a bolt 18 and a nut 19 applied to the free extremity of the latter, the said bars always being properly separated by means of a spacing sleeve 20, surrounding the bolt 18, between the bars. The forward extremity of the bar 16 is secured to the bar 15 intermediate the extremities of said bar 15 by another bolt 21, having a nut 22 applied to its free extremity. Also another spacing sleeve 20 is employed at this point to maintain the proper distance between the bars.

The forwardly projecting portion of the bar 15 is secured to one of the pedals of the bicycle in any suitable manner, as shown at 23 and terminates considerably forward of the said pedal in a slightly up-turned portion 24, which is flattened and roughened to form a foot tread. It must be understood that a construction similar to the one just described is located upon both sides of the bicycle and that a bar 15 is attached to each pedal of the same.

In operating a bicycle equipped with my improved construction the feet of the rider will engage the forward up-turned portions 24 of the bars 15, instead of the pedals of the machine and when force is exerted upon said portions 24 the bicycle will be propelled in the usual manner but with a great saving of energy, due to the increased leverage which I obtain, and the fact that the dead center is more easily overcome, and it should be especially noted that this increased leverage is obtained without lengthening the crank arms in the least, thereby rendering it possible to apply my improvement to any make or size of machine without changing the construction of the latter.

Having thus described my invention, what I claim is:

1. In combination with a machine having a pedal for propulsion thereof, of a circular shaped bearing secured to one extremity of the hub of a rear wheel, said bearing having a raceway therein and balls located in the raceway, a bar movably engaging said balls, means to retain the bar in such engagement, said bar being connected with said pedal.

2. In combination with a machine having pedals for the propulsion thereof, of a circular shaped bearing secured to each extremity of the hub of a rear wheel, said bearings having raceways therein and balls located in said raceways, the axes of said bearings coinciding with the axis of said hub, bars movably engaging said balls for reciprocation thereover, said bars being connected with the pedals.

3. In combination with a machine having a pedal for propulsion thereof, of circular shaped bearings secured to the extremities of the hub of the rear wheel and two bars secured together in parallel relation movably engaging each bearing, one of said bars projecting forwardly farther than the other and secured to the pedal of the machine.

4. In combination with a machine having a pedal for propulsion thereof, of circular shaped bearings secured to the extremities of the hub of the rear wheel, said bearings being composed of two parts and the adjacent faces of the latter having recesses formed therein to provide a race-way, balls located in said race-way projecting slightly out of the same into a circumferential groove formed in the periphery of the bearings, two bars secured together in parallel relation and engaging the balls within the circumferential groove of each bearing, one of said bars projecting forwardly farther than the other and secured to the pedal of the machine.

5. In combination with a machine having a pedal for propulsion thereof, of circular shaped bearings secured to the extremities of the hub of the rear wheel, said bearings having a race-way provided therein, balls located in said race-way and projecting slightly out of the same into a circumferential groove formed in the periphery of the bearings, two bars secured together in parallel relation and movably engaging each bearing within the circumferential groove, the opposing surfaces of said bars having a groove formed therein to prevent lateral movement upon the bearing, and one of said bars projecting forwardly farther than the other and secured to the pedal of the machine.

6. In combination with a machine having a pedal for propulsion thereof, of circular shaped bearings secured to the extremities of the hub of the rear wheel, said bearings being composed of two parts and the adjacent faces of the latter having recesses formed therein to provide a race-way for balls, the latter projecting slightly out of the said race-way into a circumferential groove formed in the periphery of the bearings, and a member movably mounted upon each bearing, said members being composed of two bars secured together in parallel relation, the opposing surfaces of which engage the balls within the circumferential groove, one of said bars projecting forwardly farther than the other and secured to the pedal of the machine.

In testimony whereof I affix my signature.

RAYMOND N. BURGEDORFF.

Copies of this patent may be obtained for five cents each, by addressing the "Commissioner of Patents, Washington, D. C."